Figure 1:
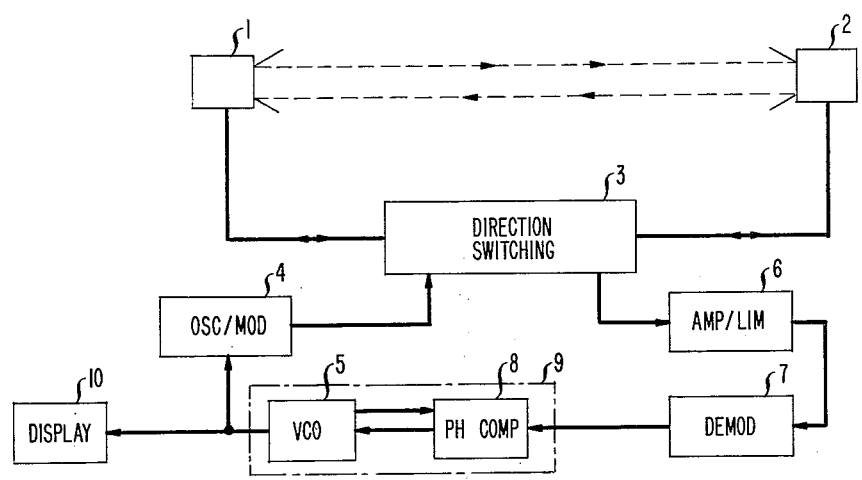

United States Patent [19]

Redding

[11] 4,320,666

[45] Mar. 23, 1982

[54] FLUID FLOW MEASURING APPARATUS

[76] Inventor: Robert J. Redding, September House, Cox Green La., Maidenhead, Berkshire SL6 3EL, England

[21] Appl. No.: 59,276

[22] Filed: Jul. 20, 1979

[30] Foreign Application Priority Data

Jul. 22, 1978 [GB] United Kingdom ............... 30774/78

[51] Int. Cl.³ .............................................. G01F 1/66
[52] U.S. Cl. .................................................. 73/861.28
[58] Field of Search ............ 73/194 A, 861.27, 861.28, 73/861.29, 861.31

[56] References Cited

U.S. PATENT DOCUMENTS

| | | | |
|---|---|---|---|
| Re. 28,929 | 8/1976 | Brown | 73/194 A |
| 2,015,933 | 10/1935 | Hartig | 73/167 |
| 2,328,546 | 9/1943 | Cafarelli, Jr. | 73/194 |
| 2,515,221 | 7/1950 | Henning | 73/861.27 |
| 2,826,912 | 3/1958 | Kritz | 73/194 |
| 2,865,196 | 12/1958 | Bordenave et al. | 73/194 |
| 3,165,928 | 1/1965 | Poulos | 73/194 |
| 3,188,862 | 6/1965 | Roth | 73/194 |
| 3,204,455 | 9/1965 | Kallmann | 73/194 |
| 3,209,591 | 10/1965 | Lester et al. | 73/181 |
| 3,214,973 | 11/1965 | Lester et al. | 73/194 |
| 3,237,453 | 3/1966 | Yamamoto et al. | 73/194 |
| 3,336,801 | 8/1967 | Snavely | 73/189 |
| 3,349,614 | 10/1967 | Parker | 73/181 |
| 3,420,102 | 1/1969 | Brown | 73/194 |
| 3,625,057 | 12/1971 | Yoshiyama et al. | 73/194 A |
| 3,641,817 | 2/1972 | Dory | 73/194 A |
| 3,675,192 | 7/1972 | Fahrbach | 340/3 D |
| 3,680,375 | 8/1972 | Joy et al. | 73/194 B |
| 3,710,792 | 1/1973 | Light | 128/2.05 |
| 3,727,454 | 4/1973 | Courty | 73/194 A |
| 3,731,532 | 5/1973 | Courty | 73/194 A |
| 3,738,169 | 6/1973 | Courty | 73/194 A |
| 3,751,979 | 8/1973 | Ims | 73/194 |
| 3,869,915 | 3/1975 | Baumoel | 73/194 A |
| 3,894,431 | 7/1975 | Muston et al. | 73/194 |
| 3,918,304 | 11/1975 | Abruzzo et al. | 73/194 A |
| 3,935,735 | 2/1976 | Lee | 73/194 A |
| 3,939,707 | 2/1976 | Kossoff | 73/194 A |
| 3,940,985 | 3/1976 | Wyler | 73/194 |
| 3,949,605 | 4/1976 | Stallworth et al. | 73/194 A |
| 3,981,191 | 9/1976 | Brown et al. | 73/194 A |
| 4,003,252 | 1/1977 | Dewath | 73/194 A |
| 4,003,256 | 1/1977 | Donelan et al. | 73/194 |
| 4,011,753 | 3/1977 | Hausler | 73/194 A |
| 4,011,755 | 3/1977 | Pedersen et al. | 73/194 |
| 4,032,259 | 6/1977 | Brown | 417/43 |
| 4,069,713 | 1/1978 | Gassmann | 73/194 |
| 4,143,548 | 3/1979 | Graewe et al. | 73/861.27 |

OTHER PUBLICATIONS

Jesperson, Control and Instrumentation, vol. 5, No. 10 (1973) pp. 37–41.
Stickman, IEEE Transactions, vol. 1M-23, No. 3, Sep. 1974, pp. 203–210, "A Sonic Velometer".
Jones, B. E. et al., IEEE Proceedings, Electronics, vol. 126, No. 8, Aug. 1979, pp. 717–720, "Phase-nulling Telemetry System Incorporating a Remote Passive Transponder".
OEM Design, Jul. 1979, "On Line Ultrasonic Measuring of Fluid Flow".

*Primary Examiner*—Herbert Goldstein
*Attorney, Agent, or Firm*—Kemon & Estabrook

[57] ABSTRACT

Fluid flow measuring apparatus comprises two ultrasonic transducers (1, 2) between which an ultrasonic energy beam is transmitted through the fluid. The beam is frequency modulated (4, 5) by an audio signal, and the relationship between the frequency or phase of the received modulation signal (6, 7, 8) and that of the transmitted modulation signal gives a measure (10) of the speed of flow of the fluid. Beams of ultrasonic energy are preferably fed in two mutually opposite directions, for example by switching (3) the transducers to act alternately as transmitter and receiver, and the measurement is computed from the two relationships. An anemometer (FIG. 7) comprises two such systems arranged to produce mutually perpendicular ultrasonic beams, and a computer (25) to compute wind speed (28) and direction (29) from the frequency or phase relationships.

7 Claims, 7 Drawing Figures

FLUID FLOW MEASURING APPARATUS

This invention relates to apparatus for the measurement of fluid flow. The apparatus may be used for measuring, for example, the velocity of flow of a fluid in a pipe, or the speed and direction of the wind.

In known fluid flow measurement systems, ultrasonic pulses are transmitted into the stream of fluid by a first transducer and are received by a second transducer downstream of the first. The apparent change in frequency or phase of the received sound waves, or the time of flight of the pulses from one transducer to the other, provides an indication of the speed of flow of the fluid.

However, the known systems use very short pulses. In order to obtain a sharp wave front, a high ultrasonic frequency has to be used, but the frequency is limited by the fact that attenuation of the transmitted pulses increases as the frequency increases. The chosen frequency must, therefore, be a compromise between the need for a sharp wave front and the need to obtain satisfactory reception over the required distance despite attenuation of the pulses in the particular medium in the transmission path.

As regards wind speed, conventional anemometers comprise a turbine or a windmill which is driven round by the wind, and a revolution counter and timer which indicates the speed of rotation of the turbine or windmill. Wind direction is indicated by the position of a pivoted vane. Such rotating devices are liable to give erroneous indications due to variations in the frictional forces acting on the devices.

It is an object of the present invention to provide an improved fluid flow measuring apparatus.

According to the present invention, fluid flow measuring apparatus comprises means to generate an electrical carrier signal; means to generate an audio-frequency modulation signal; means to frequency modulate the carrier signal in accordance with the modulation signal; first and second transducers which are spaced-apart along the fluid flow; means to feed the modulated carrier signal to one of said transducers so that said transducer transmits ultrasonic energy through the fluid to be received by the other transducer; means to monitor the relationship between the phase or frequency of the audio-frequency modulation at the transmitting transducer and the phase or frequency of the received audio-frequency modulation; and means to indicate the speed of fluid flow from the monitored relationship.

In the present invention, therefore, the ultrasonic energy is used purely as a signal carrier. The ultrasonic frequency can be chosen to suit the attenuation and/or other characteristics of the path between the transducers. The modulation frequency is not affected by the choice of ultrasonic frequency, and so the optimum modulation frequency can be selected for the required measurement.

Since the ultrasonic signal is frequency-modulated, the amplitude of the ultrasonic signal does not play any part in the measurement. Hence, changes in attentuation in the transmission path can be taken care of by merely using automatic gain control or by amplifying the signal and limiting it at a constant level. In this way, a good signal-to-noise ratio can also be obtained. Other advantages of frequency modulation, such as immunity to various types of interference, are also obtained.

The modulation signal is preferably in a phase-locked loop, so that the frequency is a measure of the fluid flow, which can be indicated on a digital display. Alternatively, if the phase relationship is monitored, the flow measurement can be displayed as an analog quantity.

Figure 2:
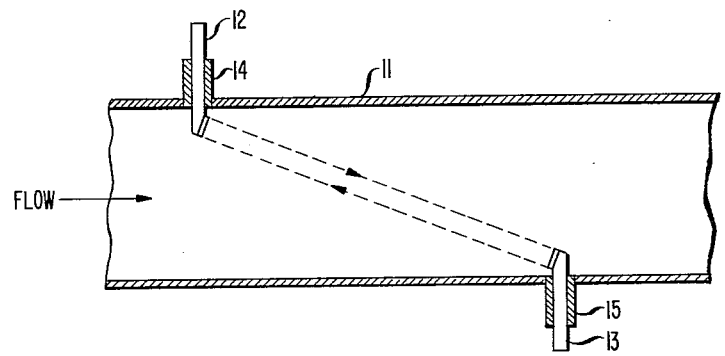
Figure 3:
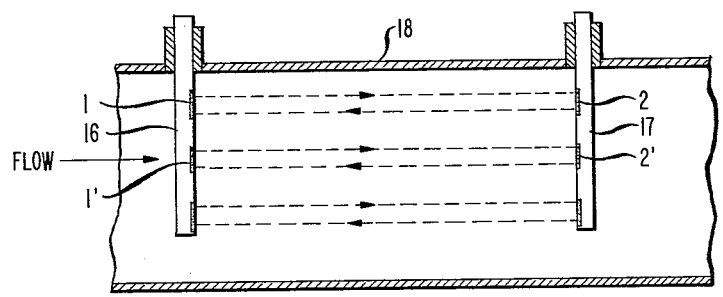
Figure 4:
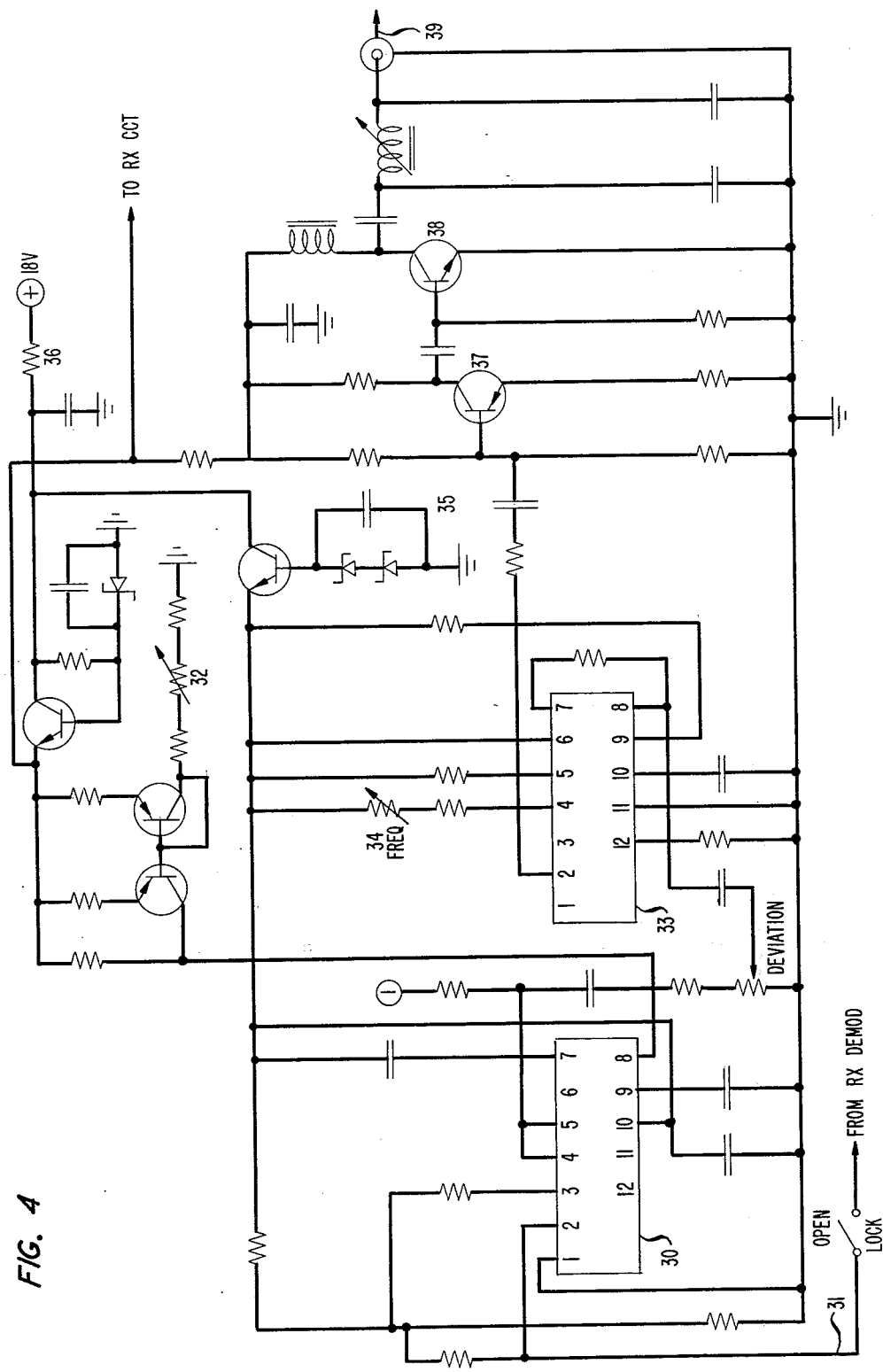
Figure 5:
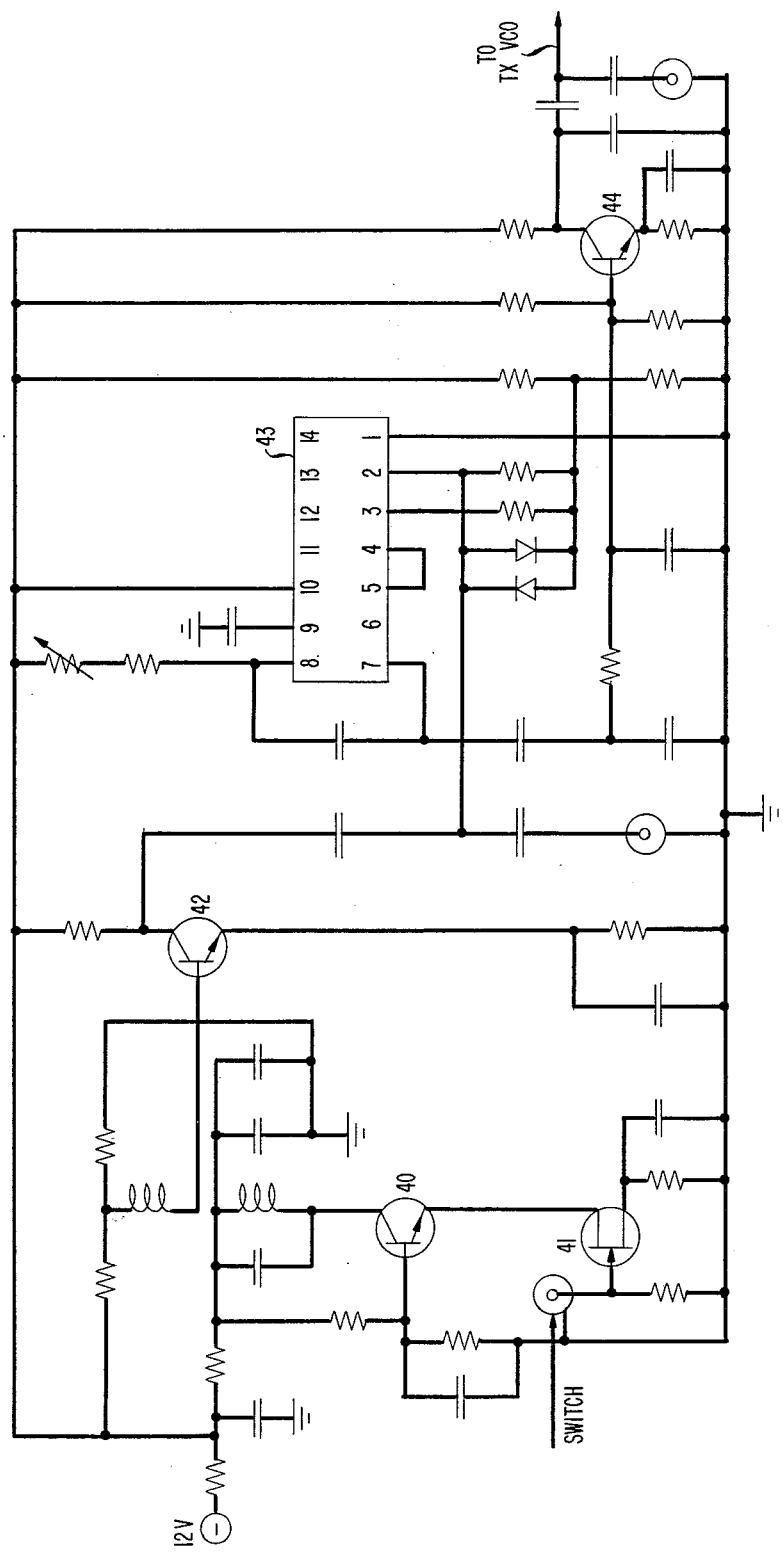
Figure 6:
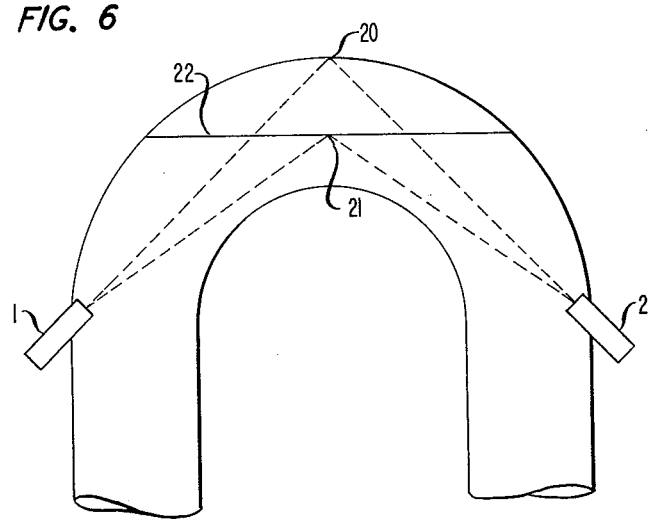
Figure 7:
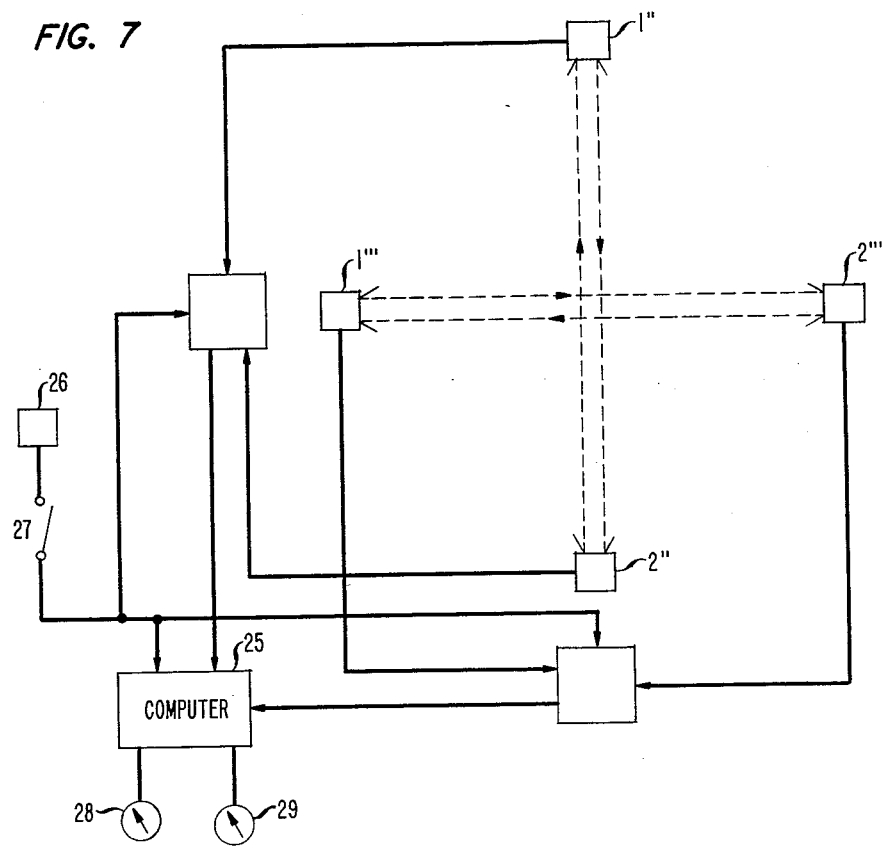

Embodiments of the invention will now be described, by way of example, with reference to the accompanying drawings, in which:

FIG. 1 is a schematic block diagram of apparatus in accordance with the present invention, FIG. 2 is a schematic cross-section of a pipe with the transducers of FIG. 1 located therein, FIG. 3 is a schematic cross-section of a pipe with a plurality of pairs of transducers located therein, FIG. 4 is a circuit diagram of a transmitter forming part of the apparatus of FIG. 1, FIG. 5 is a circuit diagram of a receiver forming part of the apparatus of FIG. 1, FIG. 6 is a schematic cross-section through a curved pipe with two transducers located therein, and FIG. 7 is a schematic block diagram of a wind speed and direction indicating apparatus.

Referring to FIG. 1 of the drawings, fluid flow measurement apparatus comprises two ultrasonic transducers 1 and 2 which are to be spaced apart along the direction of the fluid flow. Signals fed to, and received by, the transducers are controlled by a switch unit 3 so that the transducers 1 and 2 act alternately as transmitting and receiving transducers, the ultrasonic energy thereby being fed in alternately opposite directions through the fluid flow.

A carrier signal with a frequency of, for example, 60 kHz is generated by an oscillator and modulator circuit 4, and the output of this circuit is fed to the switching unit 3.

A voltage-controlled oscillator 5 generates an audio-frequency signal which is fed to the circuit 4 to frequency-modulate the carrier signal.

The signal produced by whichever of the transducers 1 and 2 is receiving the ultrasonic energy at any instant is fed via the switching unit 3 to a receiving amplifier and limiter circuit 6. This circuit ensures that, despite changes in the amplitude of the received frequency-modulated carrier signal due to, for example, changes in the attenuation which is caused by the presence of the fluid between the transducers 1 and 2, the signal presented to a demodulator circuit 7 will always be constant predetermined amplitude.

The demodulated signal from the circuit 7 is fed to a phase comparator 8 which is connected in a phase-locked loop 9 with the oscillator 5. In order to maintain the correct phase relationship between the audio-frequency signal produced by the oscillator 5 and the demodulated signal from the circuit 7, the oscillator 5 changes its output frequency to take into account changes in the time of flight of the ultrasonic signal between the transducers 1 and 2. This frequency therefore gives a measure of the speed of flow of the fluid between the transducers. Taking into account any necessary conversion constants, a display unit 10 responds to the audio-frequency signal from the oscillator 5 to give a direct indication of the speed of the fluid flow. This can be an analog or digital display.

Referring now to FIG. 2 of the drawings, a pipe 11 through which fluid is to flow is fitted with transducer probes 12 and 13 which extend into the interior of the pipe through fluid-tight bushes 14 and 15, respectively. The probes are spaced apart longitudinally of the pipe and are also relatively displaced round the periphery of the pipe by 180°. Transducers 1 and 2 at the inner ends of the probes face each other diagonally across the direction of fluid flow.

The time of flight of the transmitted signals will vary according to the velocity of flow of the fluid. If the fluid is flowing towards the right in FIG. 2 and the times of flight from transducers 1 to 2 and transducers 2 to 1 are $T_1$ and $T_2$, respectively, the fluid flow velocity will be proportional to $T_2-T_1/2$. Since the ultrasonic beam is travelling diagonally across the flow, the measured velocity will be the average velocity over the whole cross-section of the flow, assuming that the flow profile remains reasonably constant at all velocities in the range in question.

The transducers can be very small relative to the diameter of the pipe, and so do not need to interfere unduly with the fluid flow. They can be mounted at any desired depth in the flow and so can be used to monitor the flow rate at that particular depth.

FIG. 3 shows, schematically, the use of probes 16 and 17 mounted parallel to each other in a pipe 18, with pairs of transducers 1, 2; 1', 2'; etc. located at different depths in the flow. By this arrangement the pairs of transducers monitor paths which are parallel to the direction of fluid flow but which are at respectively different depths in the flow. Each pair of transducers is connected to a respective frequency modulation system as shown in FIG. 1 or, alternatively, the switching unit 3 of a single system could be designed to switch between the various transducer pairs as well as reversing the direction of the ultrasonic beam. In the latter case, respective display units would have to be switched in synchronism with the switching between pairs of transducers.

Such an arrangement would measure the flow profile, or could be used to indicate whether or not the pipe is full of fluid.

The sum of the times $T_1$ ("go") and $T_2$ ("return"), mentioned above, is a function of the speed of sound in the fluid irrespective of the rate of flow of the fluid. The speed of sound in the flow therefore varies only in dependence upon the properties of the fluid, such as its density. If it is required to monitor mass flow instead of volume flow, the temperature of the flowing fluid can be measured, and a correction applied to the indication on the display unit 10. Alternatively, the mass flow may be computed from the times $T_1$ and $T_2$ and the temperature coefficient of the velocity of sound.

Referring to FIG. 6, the transducers 1 and 2 do not necessarily have to be arranged such that there is a straight direct path for the ultrasonic beam from one transducer to the other. In the illustrated arrangement, the transducers are mounted in a U-bend with their axes perpendicular to each other. The beam will be reflected at a point 20 by the wall of the pipe if the pipe is full of a homogeneous fluid, but will be reflected at a point 21 if there is an interface 22 between dissimilar fluids, such as a gas and a liquid.

A further arrangement of transducers is shown in FIG. 7. This arrangement acts as an anemometer. Two pairs of piezo ceramic transducers 1", 2" and 1"', 2"' are so arranged that the paths of the respective ultrasonic beams are mutually perpendicular. Each pair of transducers is coupled to a respective frequency modulation system as shown in FIG. 1. The audio frequency signals generated by the respective oscillator 5 are fed to a computer 25 which computes the wind speed and direction therefrom.

When the air is still and the two paths are the same length, the two signals fed to the computer 25 will be the same, although the actual value will vary with changes in the temperature and humidity. A zero wind speed will therefore be indicated. The transit times will be the same irrespective of the direction of the transmission between the transducers.

However, if a wind is blowing, the effect is to move the air so that the transit times will be different according to the angle of the wind. The audio frequencies for each transmission direction and each pair of transducers provides sufficient information for calculating the wind speed and direction. A microprocessor is easily programmed for this purpose and may have spare capacity for providing the electronic circuitry as shown in FIG. 1.

It will be appreciated that each transducer can act as both transmitter and receiver, but separate units can be provided for transmit and receive to avoid the need for switching the direction of the beam. The output of the computer 25 can be two continuous signals representing the speed and direction, and these signals can be fed to indicators 28 and 29 or in a pulse or frequency form suitable for transmission to other locations.

The energy level required to operate the system is very small, typically ¼ watt, and the system has no inherent time lags and no warm up time so that the connection of a power supply to the system gives immediate speed and direction readings.

The system may conveniently be powered by a battery 26 via a switch 27 which is closed manually or automatically when a reading is required and which then returns to the open position. The battery 26 can be a battery of rechargeable secondary cells which can be trickle-charged by power from a solar cell. The system can therefore be self-contained and portable.

The anemometer could be mounted on a boat or other vehicle to measure the "apparent wind".

Suitable parameters for the anemometer system are: 1 meter transducer spacing, 100 kHz carrier frequency, 3,310 Hz modulation frequency when air is still, 3,320 Hz modulation frequency when wind speed is 1 meter/sec. along the direction of the relevant ultrasonic beam. The working range can be very wide, but for meterological use a range of 0-30 meters/sec wind speed is typical, and this may conveniently be divided into two ranges, viz. 0-3 meters/sec and 0-30 meters/sec. The instrument may alternatively be used in respect of other fluids, for example water. In the latter case, a carrier frequency of 500 kHz and a modulation frequency of 3 Khz would be suitable.

FIG. 4 illustrates one circuit configuration which may be used for the phase-locked loop 9 and the carrier generator and modulator circuit 4 of FIG. 1. The phase-locked loop comprises an integrated circuit 30 with associated components. The demodulated signal is fed to the circuit 30 via a line 31 and the nominal frequency is set by means of a variable resistor 32. The carrier generator and modulator circuit comprises an integrated circuit 33 and the carrier frequency is set by a variable resistor 34. The integrated circuits 30 and 33 are supplied with power by a stabiliser circuit 35 from an 18 volt supply line 36.

The modulated carrier signal is fed to an amplifier comprising transistors 37 and 38 and the amplified signal is fed via a line 39 to the switch unit 3 of FIG. 1.

FIG. 5 illustrates one suitable configuration for the circuits 6 and 7 of FIG. 1. The amplifier circuit 6 comprises transistors 40, 41 and 42 and associated components, and the demodulator circuit 7 comprises an integrated circuit 43. The demodulated audio-frequency output is amplified by a transistor 44 and is then fed to the line 31 of FIG. 4.

Variations in the above-described apparatus are possible without departing from the scope of the present invention.

I claim:

1. Fluid flow measuring apparatus comprising:
   means to generate an electrical carrier signal;
   means to generate a modulation signal;
   means to frequency modulate the carrier signal in accordance with the modulation signal;
   first and second transducers which are spaced-apart along the fluid flow;
   means to feed the modulated carrier signal to one of said transducers so that said transducer transmits ultrasonic energy through the fluid to be received by the other transducer;
   a phase-locked loop to maintain a fixed relationship between the phase of the modulation fed to the transmitting transducer and the phase of the modulation received by the receiving transducer by adjustment of the frequency of said modulation signal; and
   means responsive to said frequency of said modulation signal to indicate speed of fluid flow.

2. Apparatus as claimed in claim 1, including means to cause the ultrasonic energy to be transmitted in two mutually opposite directions through the flow, and wherein the indicating means includes means to compute the flow speed from the monitored relationships for the two transmission directions.

3. Apparatus as claimed in claim 2, wherein the means to cause the transmission in two mutually opposite directions comprises switching means to feed the modulated carrier signal to the first and second transducers alternately.

4. Apparatus as claimed in claim 1, wherein the transducers are mounted on opposite sides of a pipe in which the fluid flows, whereby the ultrasonic energy traverses a cross-section of the flow.

5. Apparatus as claimed in claim 1, including a plurality of pairs of said first and second transducers, each pair being arranged to transmit and receive ultrasonic energy along mutually parallel paths at different regions of the cross-section of the flow, whereby the indicator means indicate the profile of the flow.

6. Apparatus as claimed in claim 1, including two pairs of said first and second transducers arranged to transmit the ultrasonic energy along respective paths which are mutually perpendicular; and wherein the indicator means includes means to compute wind speed and direction from the monitored relationships for the two paths.

7. Fluid flow measuring apparatus comprising:
   means to generate a first electrical carrier signal;
   means to generate a first modulation signal;
   means to frequency modulate said first carrier signal in accordance with said first modulation signal;
   means to generate a second electrical carrier signal having a different frequency from said first electrical carrier signal;
   means to generate a second modulation signal;
   means to frequency modulate said second carrier signal in accordance with said second modulation signal;
   first and second transducer means which are spaced-apart along the fluid flow;
   means to feed the frequency modulated first carrier signal to said first transducer means so that said first transducer continuously transmits ultrasonic energy through the fluid to be received by said second transducer means;
   means to feed the frequency modulated second carrier signal to said second transducer means so that said second transducer means continuously transmits ultrasonic energy through the fluid to be received by said first transducer means;
   a first phase-locked loop to maintain a fixed relationship between the phase of the modulation at said first transducer means and the phase of the received modulation at said second transducer means by adjustment of the frequency of said first modulation signal;
   a second phase-locked loop to maintain a fixed relationship between the phase of the modulation at said second transducer means and the phase of the received modulation at said first transducer means by adjustment of the frequency of said second modulation signal; and
   means responsive to the relationship between the frequencies of said first and second modulation signals to indicate the speed of fluid flow.

* * * * *